United States Patent
Gur et al.

(10) Patent No.: US 10,065,482 B1
(45) Date of Patent: Sep. 4, 2018

(54) VEHICLE FLOW INFLUENCING ASSEMBLY AND METHOD

(71) Applicant: Ford Global Technologies, LLC, Dearborn, MI (US)

(72) Inventors: Yuksel Gur, Ann Arbor, MI (US); David Anthony Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/491,020

(22) Filed: Apr. 19, 2017

(51) Int. Cl.
*B60J 1/20* (2006.01)
*B60J 10/76* (2016.01)
*B62D 25/04* (2006.01)
*B62D 35/00* (2006.01)

(52) U.S. Cl.
CPC ............. *B60J 1/2002* (2013.01); *B60J 10/76* (2016.02); *B62D 25/04* (2013.01); *B62D 35/008* (2013.01)

(58) Field of Classification Search
CPC ...... B62D 25/04; B62D 35/008; B60J 1/2002; B60J 10/50; B60J 10/76
USPC ................... 296/180.1, 180.5, 152
See application file for complete search history.

(56) References Cited

U.S. PATENT DOCUMENTS

| | | | | |
|---|---|---|---|---|
| 2,841,440 A | * | 7/1958 | Werner | B60J 1/14 296/152 |
| 3,785,699 A | * | 1/1974 | Molaskey | B60J 1/2002 296/152 |
| 4,062,272 A | * | 12/1977 | McCarroll | B60J 1/20 156/107 |
| 4,476,774 A | * | 10/1984 | Liberto | B60J 1/20 454/128 |
| 4,685,718 A | * | 8/1987 | Steenblik | B60J 1/20 296/154 |
| 5,052,745 A | * | 10/1991 | Preiss | B60J 7/22 296/180.5 |
| 5,114,205 A | * | 5/1992 | Jee | B60J 1/2002 296/152 |
| 5,251,953 A | * | 10/1993 | Willey | B60J 1/2002 296/152 |
| 5,460,425 A | * | 10/1995 | Stephens | B60J 1/20 296/152 |
| 5,676,418 A | | 10/1997 | Strefling | |

(Continued)

FOREIGN PATENT DOCUMENTS

KR 101149654 5/2012

*Primary Examiner* — Gregory A Blankenship
(74) *Attorney, Agent, or Firm* — Carlson, Gaskey & Olds, P.C.

(57) ABSTRACT

An exemplary vehicle flow influencing assembly includes a deflector formed together with a seal that provides a portion of a glass run for a side window of a vehicle. The deflector projects outward from the vehicle when the side window is lowered such that the deflector influences flow over an opening to a passenger compartment of the vehicle. A vehicle flow influencing assembly includes a pillar that is directly forward a side window of a vehicle, and a deflector configured to influence flow over an opening to a passenger compartment of the vehicle. The opening is provided by positioning the side window in an open position. The deflector extends longitudinally in a direction aligned with the pillar. The deflector projects outward from a primary surface of the pillar when the side window is closed and when the side window is open.

11 Claims, 5 Drawing Sheets

(56) References Cited

U.S. PATENT DOCUMENTS

| | | | |
|---|---|---|---|
| 5,702,149 A * | 12/1997 | Sweeney | B60J 1/2002 296/152 |
| 6,899,376 B1 * | 5/2005 | Sullivan | B62D 35/001 296/180.1 |
| 6,971,710 B1 * | 12/2005 | Raasakka | B60J 7/22 296/217 |
| 7,367,609 B2 * | 5/2008 | Grudzinski | B62D 35/00 296/152 |
| 7,641,275 B2 | 1/2010 | Campbell et al. | |
| 7,744,147 B2 | 6/2010 | Jeong | |
| 8,226,152 B2 | 7/2012 | Calco | |
| 9,630,481 B2 * | 4/2017 | Rose | B60J 10/70 |
| 2016/0263977 A1 * | 9/2016 | Kalliomaki | B60J 1/20 |
| 2018/0056766 A1 * | 3/2018 | Vojtisek | B60J 10/50 |

\* cited by examiner

VEHICLE FLOW INFLUENCING ASSEMBLY AND METHOD

TECHNICAL FIELD

This disclosure relates generally to influencing flow around a vehicle to reduce buffeting. In particular, the disclosure relates to influencing flow using a passive deflector that does not require an actuator.

BACKGROUND

Buffeting (i.e., wind throb) can occur when a window of a vehicle is opened while the vehicle is moving. Buffeting is typically a high decibel, low frequency, throbbing sound that can be objectionable to occupants within a passenger compartment of the vehicle.

Some vehicles incorporate buffers with complicated actuating mechanisms. These buffers can be actuated to a position where the buffer disrupts flow moving over the window. Disrupting the flow can reduce noise from buffeting.

SUMMARY

A vehicle flow influencing assembly according to an exemplary aspect of the present disclosure includes, among other things, a deflector formed together with a seal that provides a portion of a glass run for a side window of a vehicle. The deflector projects outward from the vehicle when the side window is lowered such that the deflector influences flow over an opening to a passenger compartment of the vehicle.

In a further non-limiting embodiment of the foregoing assembly, the deflector and the seal are formed together as a continuous, monolithic structure.

In a further non-limiting embodiment of any of the foregoing assemblies, the deflector is formed together with the seal providing an exterior side of the glass run such that the deflector is outside the passenger compartment when the side window is closed.

In a further non-limiting embodiment of any of the foregoing assemblies, the deflector is formed together with the seal providing an interior side of the glass run such that the deflector is inside the passenger compartment when the side window is closed.

In a further non-limiting embodiment of any of the foregoing assemblies, the deflector is configured to move from a deployed position to a retracted position in response to movement of the side window toward a closed position.

In a further non-limiting embodiment of any of the foregoing assemblies, the deflector is biased toward the deployed position.

In a further non-limiting embodiment of any of the foregoing assemblies, the deflector is a passive deflector.

A vehicle flow influencing assembly according to another exemplary aspect of the present disclosure includes, among other things, a pillar that is directly forward a side window of a vehicle, and a deflector configured to influence flow over an opening to a passenger compartment of the vehicle. The opening is provided by positioning the side window in an open position. The deflector extending longitudinally in a direction aligned with the pillar. The deflector projects outward from a primary surface of the pillar when the side window is closed and when the side window is open.

In a further non-limiting embodiment of the foregoing assembly, the pillar is a B-pillar.

In a further non-limiting embodiment of any of the foregoing assemblies, the deflector includes a plurality of notches distributed longitudinally along the deflector such that the deflector projects from the primary surface further in some areas than in other areas.

In a further non-limiting embodiment of any of the foregoing assemblies, the deflector projects outward 20 millimeters or more from the primary surface of the pillar.

In a further non-limiting embodiment of any of the foregoing assemblies, the deflector projects outward from 20 to 30 millimeters from the primary surface of the pillar.

In a further non-limiting embodiment of any of the foregoing assemblies, the deflector is a passive deflector.

A vehicle flow influencing method according to yet another exemplary aspect of the present disclosure includes, among other things, lowering a side window to provide an opening to a passenger compartment of a vehicle, and influencing flow over the opening using a deflector aligned with a pillar that is upstream from the side window relative to the direction of flow. The influencing occurs without utilizing an actuator to deploy the deflector.

In a further non-limiting embodiment of the foregoing method, the deflector is formed together with a seal that provides a portion of a glass run for the side window.

A further non-limiting embodiment of any of the foregoing methods includes raising the side window to move the deflector away from the deployed position.

In a further non-limiting embodiment of any of the foregoing methods, the deflector projects outward from a primary surface of the pillar when the side window is closed and when the side window is open.

In a further non-limiting embodiment of any of the foregoing methods, the deflector projects outward 20 millimeters or more from the primary surface of the pillar.

In a further non-limiting embodiment of any of the foregoing methods, the deflector is a passive deflector.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to flow influencing assemblies incorporated into a vehicle. The flow influencing assemblies include a deflector that disrupts flow across an open rear side window, which can lessen buffeting associated with flow moving across the opening. The flow influencing assemblies are passive and do not require complex actuating mechanisms.

Figure 1:
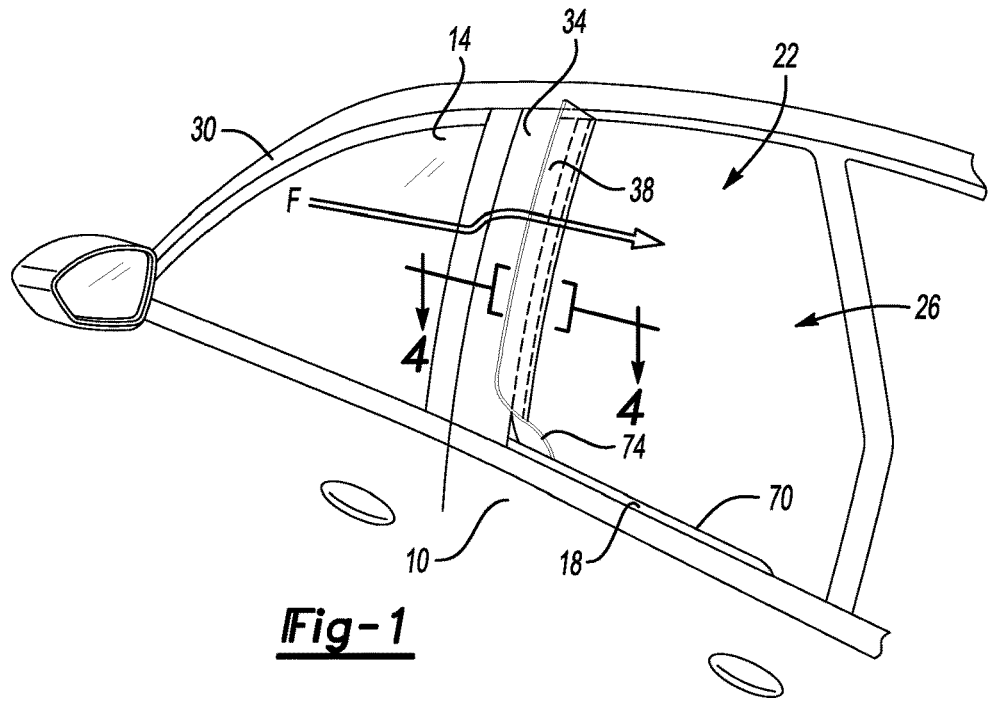
FIG. 1 illustrates a perspective view of a vehicle incorporating a flow influencing assembly according to an exemplary embodiment of the present disclosure when a rear side window of the vehicle is open.
Figure 2:
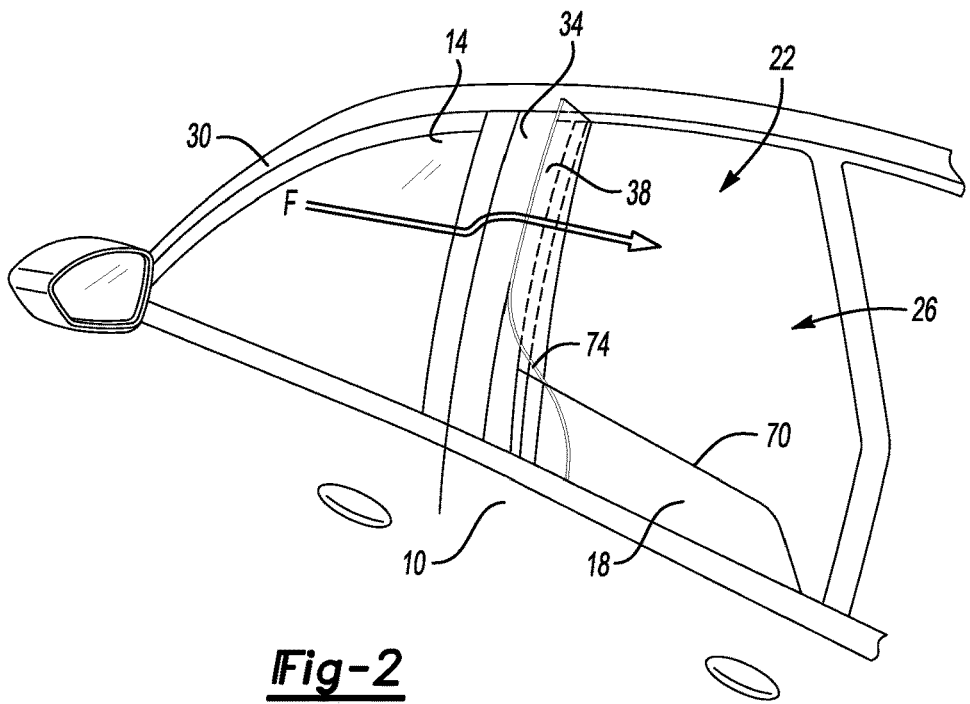
FIG. 2 illustrates the flow influencing assembly of FIG. 1 when the rear side window is less open than in FIG. 1.

Referring now to FIGS. 1-5, an example vehicle 10 includes a front side window 14 and a rear side window 18. In FIG. 1, the side window 14 is fully closed and the side window 18 is open.

Driving the vehicle 10 when the side windows 14, 18 are positioned in this way can cause the passengers within a passenger compartment 22 of the vehicle 10 to experience buffeting noise. Buffeting is typically a high decibel, low frequency, throbbing sound resulting from the Helmholtz resonator phenomenon associated with a flow F moving over an opening 26 created when the side window 18 is lowered.

The vehicle 10 includes an A-pillar 30, a B-pillar 34, and a deflector 38 associated with the B-pillar 34. The deflector 38 provides a portion of a flow influencing assembly to influence the flow F.

The A-pillar 30 is upstream from the front side window 14 relative to a direction of the flow F over the vehicle 10 as the vehicle 10 moves forward. The B-pillar 34 is upstream from the side window 18 relative to the direction of the flow F over the vehicle 10 as the vehicle 10 moves forward.

The deflector 38 is utilized to influence the flow F moving along the vehicle 10 toward the opening 26. The deflector 38 influences the flow F by redirecting and disrupting the flow F, which can reduce the buffeting noise experienced by passengers within the passenger compartment 22 when the side window 18 is in position of FIG. 1.

The example deflector 38 projects outward from the vehicle 10 and the B-pillar 34 when the side window 18 is lowered. The deflector 38 is formed together with part of a seal 50 that provides a glass run 54 for the side window 18. The glass run 54 essentially provides a channel that constrains movement of the side window 18 as the side window 18 is moved back and forth between fully closed and open positions.

Forming the deflector 38 with the seal 50 can, among other things, reduce manufacturing costs since no separate component is required to provide the deflector 38. The seal 50, and thus the deflector 38, can be silicone, rubber, polymer-based, etc.

In this example, the seal 50 providing the glass run 54 has an outer portion 58 and an inner portion 62. The outer portion 58 provides an outer wall 64 of the glass run 54 and a portion of a floor of the glass run 54. The inner portion 62 provides an inner wall 66 of the glass run 54 and a portion of the floor of the glass run 54. Outer and inner are with respect to the passenger compartment 22. The deflector 38 is, in this example, formed together with the inner portion 62 of the seal 50.

Figure 4:
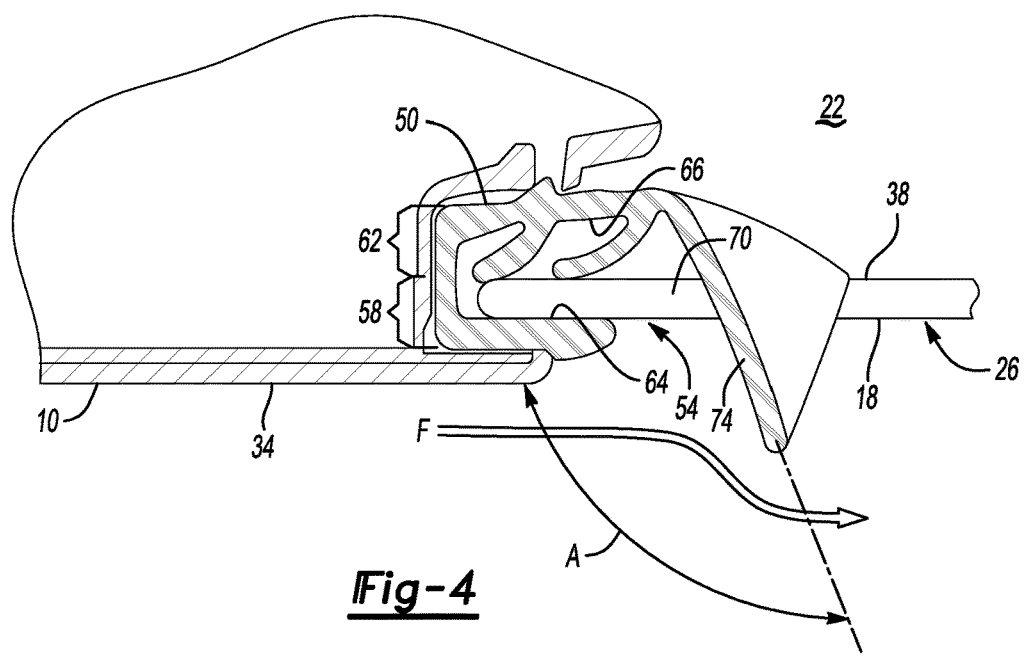
FIG. 4 illustrates a section view taken at line 4-4 in FIG. 1.
Figure 5:
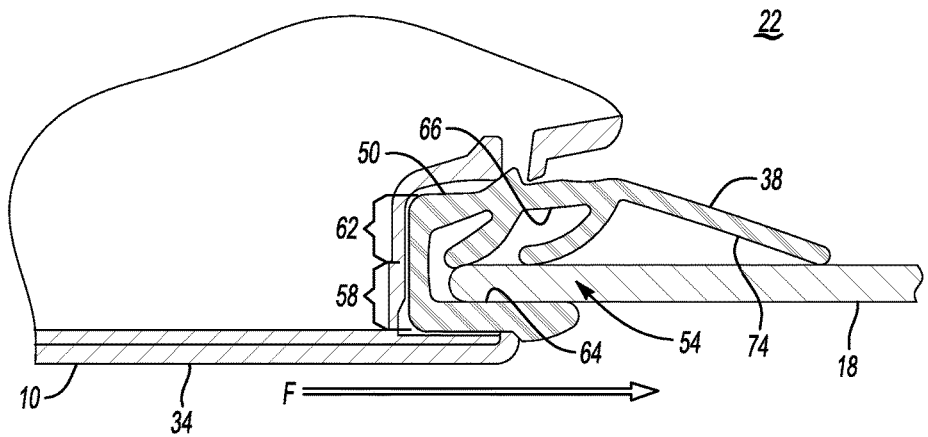
FIG. 5 illustrates a section view taken at line 5-5 in FIG. 3.

The deflector 38 is formed together with the remaining portions of the seal 50 as a continuous, monolithic, uninterrupted structure. The deflector 38 is formed with the remaining portions of the seal 50 such that the deflector 38 extends at an angle A from the inner wall 66 of the B-pillar 34 (FIG. 4). In this example, the angle A is about 135°. When the deflector 38 extends at the angle A, the deflector 38 is in a deployed position.

Since the deflector 38 is formed to extend from the inner wall 66 at the angle A, the deflector 38 is biased toward this position. The side window 18, when raised, forces the deflector 38 away from a position where the deflector 38 extends at the angle A, which prevents the deflector 38 from projecting outward away from the B-pillar 34. When the side window 18 is lowered, the portions of the deflector 38 that are no longer contacted by the side window 18 tend to return position where the deflector 38 extends at the angle A, which causes these portions of the deflector 38 to project outward away from the B-pillar 34 and influence the flow F.

Figure 3:
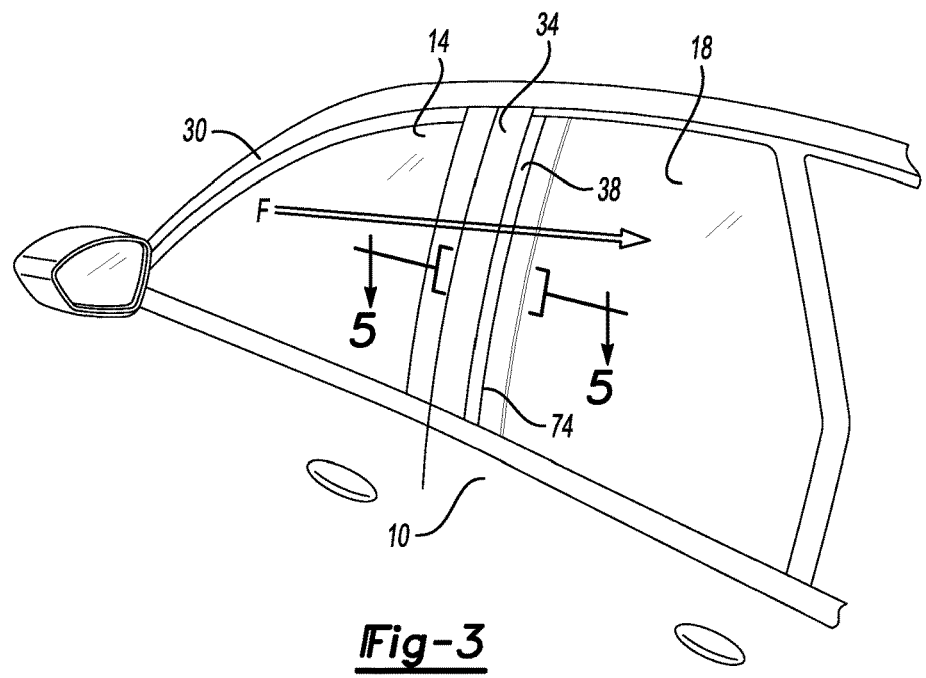
FIG. 3 illustrates the flow influencing assembly of FIG. 1 when the rear side window is fully closed.

The deflector 38 is moved from the fully deployed position of FIG. 1 to the retracted position of FIG. 3 due to the closing of the side window 18. When the deflector 38 retracted, the deflector 38 is within the passenger compartment 22.

As the side window 18 is raised from the position of FIG. 1, an upper edge 70 of the side window 18 contacts against an outwardly facing surface 74 of the deflector 38. This contact presses the deflector 38 inward toward the passenger compartment 22 into a retracted position. The deflector 38 is thus substantially hidden from view when the side window 18 is raised, which can provide desired design characteristics for the vehicle 10.

The deflector 38 is considered passive as no specific actuator is required to deploy and retract the deflector 38. The deflector 38 is biased toward the deployed position of FIGS. 1 and 4. Raising the side window 18 overcomes the bias to force the deflector 38 into the retracted position.

Figure 6:
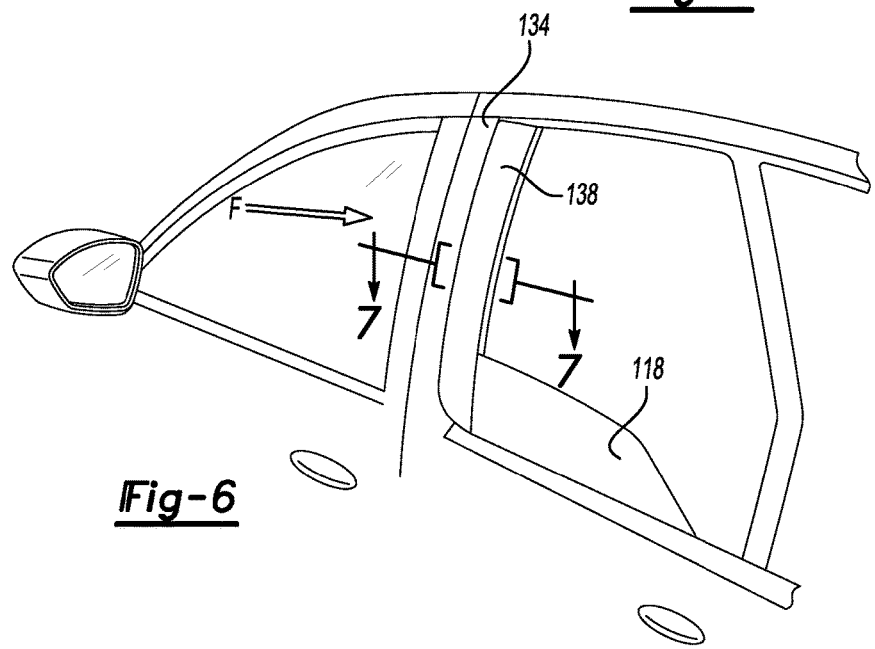
FIG. 6 illustrates a perspective view of a vehicle incorporating a flow influencing assembly according to another exemplary embodiment of the present disclosure when a rear side window of the vehicle is partially open.
Figure 7:
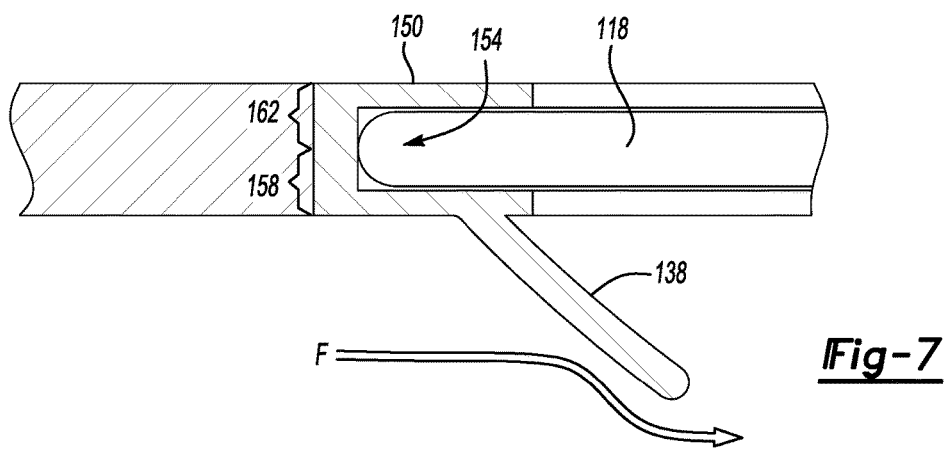
FIG. 7 illustrates a section view taken at line 7-7 in FIG. 6.

Referring now to FIGS. 6 and 7, another example deflector 138 is formed together as part of a seal 150 that provides a glass run 154 to accommodate a side window 118. The deflector 138 is molded with an outer portion 158 of the seal 150 rather than an inner portion 162 of the seal 150. The deflector 138 is formed together with the seal 150 providing an exterior side of the glass run 154 such that the deflector 138 is outside the passenger compartment when the side window 118 is closed.

The deflector 138 extends to a deployed position that disrupts flow F. The deflector 138 extends outward from a B-pillar 134 when the side window 118 is fully open, partially open, or closed.

The deflector 138 is formed together with the remaining portions of the seal 150 as a continuous, monolithic, uninterrupted structure. The deflector 138 is formed with the remaining portions of the seal 150 such that the deflector 138 extends at a desired angle the B-pillar 134.

The deflectors 38 and 138 formed with the seals 50, 150 could include castellations, such as notches or grooves, to further disrupt flow over an opening to the passenger compartment resulting from lowering the side windows 18, 118.

Figure 8:
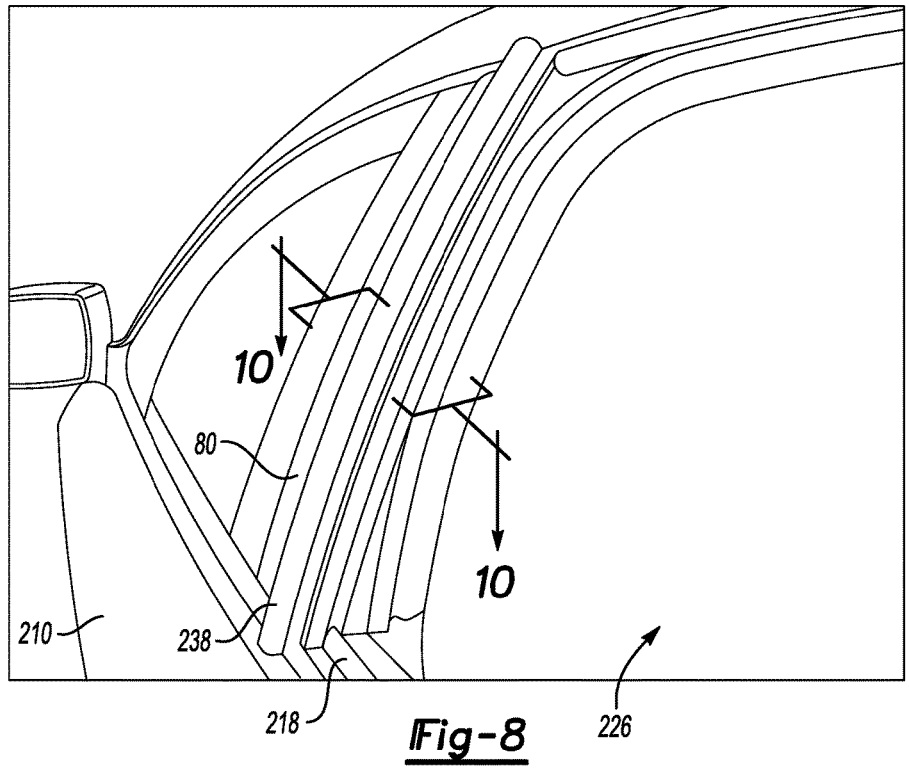
FIG. 8 illustrates a perspective view of a vehicle incorporating a flow influencing assembly according to still another exemplary embodiment of the present disclosure when a rear side window of the vehicle is fully open.
Figure 9:
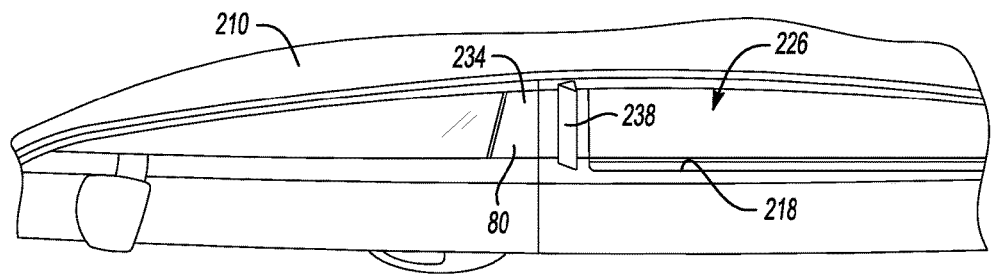
FIG. 9 illustrates a top view of a side of the vehicle having the flow influencing assembly of FIG. 8.
Figure 10:
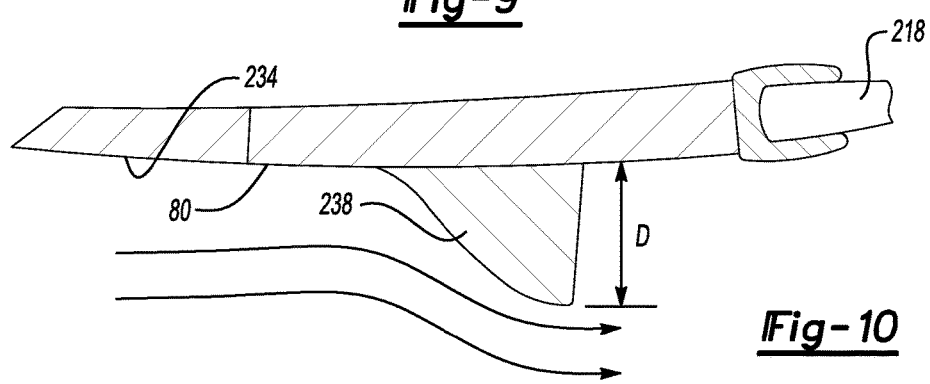
FIG. 10 illustrates a section view at line 10-10 in FIG. 8.

Referring now to FIGS. 8 to 10, yet another example deflector 238 is attached directly to a B-pillar 234 of a vehicle 210. The B-pillar 234 is upstream from a side window 218 of the vehicle 210. The deflector 238 is attached to an outwardly facing surface of the B-pillar. The deflector 238 has a ramp shaped cross-section.

The B-pillar 234 has a primary surface 80. The deflector 238 outward from the primary surface 80. In some examples, the deflector 238 is adhesively secured to the portion of the B-pillar 234 provided by the rear door glued on the rear door part of the B-pillar primary surface 80. The deflector 238 influences flow F moving over an opening 226 resulting from lowering the side window 218.

In this example, the deflector 238 projects a distance D from the primary surface 80 of the B-pillar 234. The distance D can be 20 millimeters more. In a specific example, the distance D is from 20 to 30 millimeters.

Notably, the deflector 238 is not moveable between a deployed and a retracted position. Thus, the deflector 238 is projecting outward from the primary surface 80 of the B-pillar 234 when the side window 218 is open and when the side window 218 is closed. The deflector 238 is visible from outside the vehicle 210 when the side window 218 is open and when the side window 218 is closed.

The deflector 238 is generally aligned with the B-pillar 234. This example, the B-pillar 234 and the deflector 238 both extend vertically.

Figure 11:
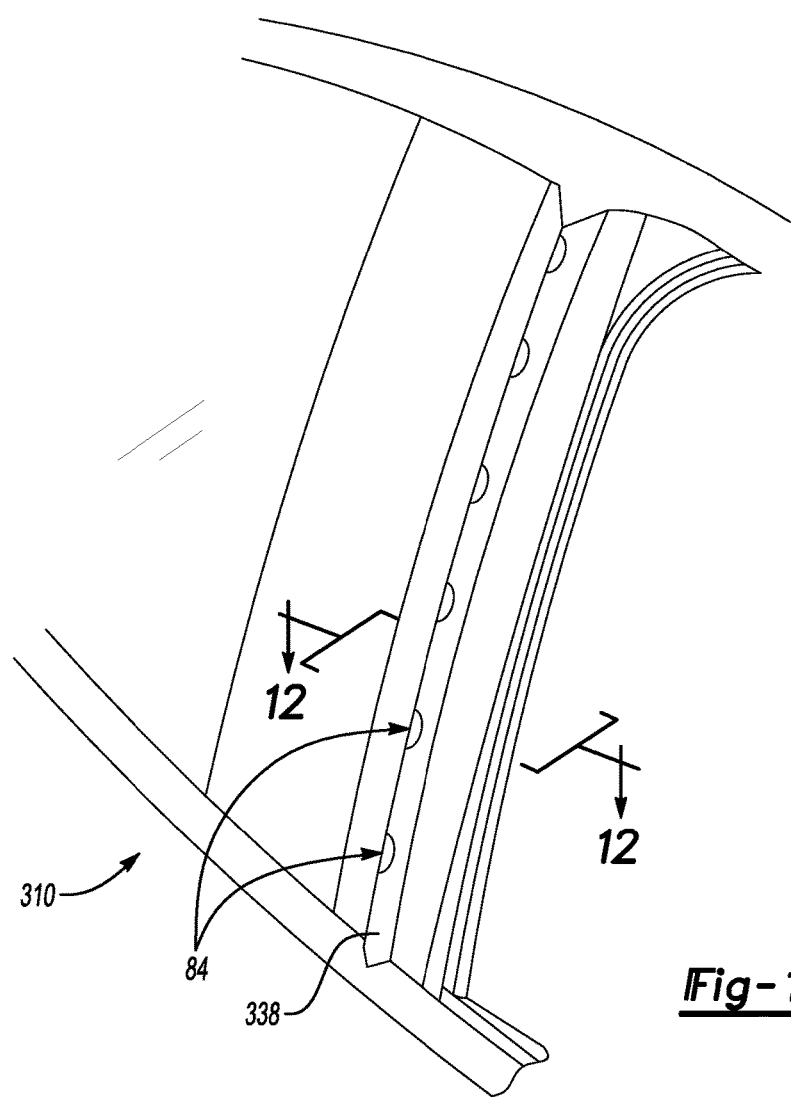
FIG. 11 illustrates a perspective view of a vehicle incorporating a flow influencing assembly according to still another exemplary embodiment of the present disclosure when a rear side window of the vehicle is fully open.
Figure 12:
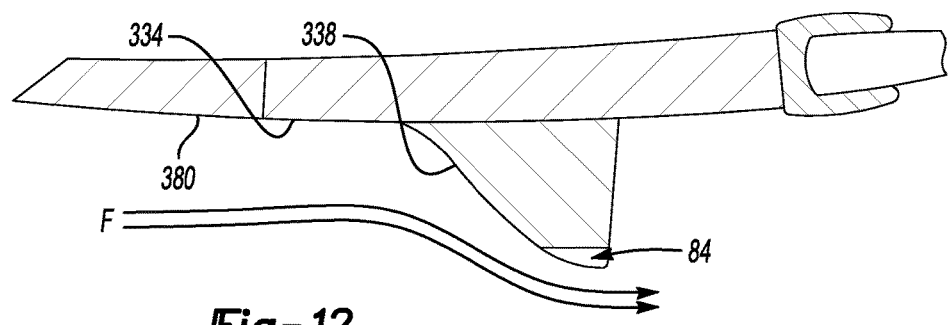
FIG. 12 illustrates a section view at line 12-12 in FIG. 11.

Referring to FIGS. 11 and 12, a deflector 338 is similar to the deflector 238 described in connection with FIGS. 8 to 10, but includes a series of notches 84 distributed longitudinally along the deflector 338.

The notches 84 can further disrupt flow F moving over the deflector 338 as the vehicle 310 is driven forward. Due to the notches 84, the deflector 338 projects further from a primary surface 380 of the B-pillar 334 in some areas than in other areas.

Features of some of the disclosed embodiments include a flow influencing assembly incorporating a deflector that is passive. That is, no separate component is required to move or hold the flow influencing assembly in a deployed position where the deflector can influence flow. Deflector height, angle, and (if used) castellation width can be tuned to reduce buffeting.

In some examples, the order of these parameters in decreasing levels of importance to reducing buffeting noise are the deflector height, deflector angle of attack, and (if used) castellation width. Increasing deflector height can decrease the buffeting noise level and the loudness level. Increasing the deflector's angle of attack can also decrease the buffeting noise level and the loudness level. Incorporating at least one castellation can decrease the buffeting noise level as well.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle flow influencing assembly, comprising:
a deflector formed together with a seal that provides a portion of a glass run for a side window of a vehicle, the deflector projecting outward from the vehicle when the side window is lowered such that the deflector influences flow over an opening to a passenger compartment of the vehicle, the deflector configured to move from a deployed position to a retracted position in response to movement of the side window toward a closed position.

2. The vehicle flow influencing assembly of claim 1, wherein the deflector and the seal are formed together as a continuous, monolithic structure.

3. The vehicle flow influencing assembly of claim 1, wherein the deflector is formed together with the seal providing an exterior side of the glass run such that the deflector is outside the passenger compartment when the side window is closed.

4. The vehicle flow influencing assembly of claim 1, wherein the deflector is biased toward the deployed position.

5. The vehicle flow influencing assembly of claim 1, wherein the deflector is a passive deflector.

6. A vehicle flow influencing assembly, comprising:
a deflector formed together with a seal providing an interior side of a glass run for a side window of a vehicle, such that the deflector is inside a passenger compartment of the vehicle when the side window is closed, the deflector projecting outward from the vehicle when the side window is lowered such that the deflector influences flow over an opening to the passenger compartment.

7. A vehicle flow influencing method, comprising:
lowering a side window to provide an opening to a passenger compartment of a vehicle;
influencing flow over the opening using a deflector aligned with a pillar that is upstream from the side window relative to the direction of flow, the influencing occurring without utilizing an actuator to deploy the deflector; and
raising the side window to move the deflector away from a deployed position.

8. The vehicle flow influencing method of claim 7, wherein the deflector is formed together with a seal that provides a portion of a glass run for the side window.

9. The vehicle flow influencing method of claim 7, wherein the deflector projects outward from a primary surface of the pillar when the side window is closed and when the side window is open.

10. The vehicle flow influencing method of claim 9, wherein the deflector projects outward 20 millimeters or more from the primary surface of the pillar.

11. The vehicle flow influencing method of claim 7, wherein the deflector is a passive deflector.

* * * * *